United States Patent [19]

Gilkey

[11] Patent Number: 4,642,971
[45] Date of Patent: Feb. 17, 1987

[54] METHOD AND APPARATUS FOR TRIMMING PRODUCT FROM CAN FLANGE AREA

[75] Inventor: Lance R. Gilkey, Puyallup, Wash.

[73] Assignee: Alaska Canning & Marine Equipment, Inc., Seattle, Wash.

[21] Appl. No.: 712,548

[22] Filed: Mar. 15, 1985

Related U.S. Application Data

[63] Continuation-in-part of Ser. No. 494,565, May 13, 1983, abandoned.

[51] Int. Cl.⁴ .............................................. B65B 63/00
[52] U.S. Cl. ........................................ 53/435; 53/514; 53/517; 53/167; 141/89
[58] Field of Search .................. 53/167, 431, 432, 435, 53/514, 517; 141/88, 91, 93, 147; 100/295, 902; 83/53

[56] References Cited

U.S. PATENT DOCUMENTS

| | | |
|---|---|---|
| 652,581 | 6/1900 | Ayars . |
| 1,822,614 | 9/1931 | Darling . |
| 2,300,704 | 11/1942 | Russell ................. 741/89 X |
| 2,444,502 | 7/1948 | Fromer ..................... 141/89 |
| 3,040,493 | 6/1962 | Wheaton ................... 53/167 |
| 3,175,337 | 3/1965 | Roberts et al. . |
| 3,180,068 | 4/1965 | Maher ...................... 53/167 |
| 3,351,473 | 11/1967 | Belk . |
| 3,545,160 | 12/1970 | Jantze et al. ........... 53/432 X |
| 3,700,386 | 10/1972 | Menacci . |
| 3,919,828 | 11/1975 | Zellman . |
| 4,121,400 | 10/1978 | Sohn et al. . |

Primary Examiner—John Sipos
Assistant Examiner—Steven P. Weihrouch
Attorney, Agent, or Firm—Dowrey & Cross

[57] ABSTRACT

A method and apparatus for cutting debris from the flange area of a can includes directing a pressurized jet onto the flange area while rotating the can about its longitudinal axis. A plunger carries an anvil which is inserted into the can and shields its contents from the spray of the water jet while providing a back up for the cutting action.

25 Claims, 13 Drawing Figures

METHOD AND APPARATUS FOR TRIMMING PRODUCT FROM CAN FLANGE AREA

This is a continuation in part of my co-pending U.S. patent application, Ser. No. 494,565, filed May 13, 1983 now abandoned.

BACKGROUND OF THE INVENTION

1. Field of the Invention

The present invention relates to open top container filling and closing methods and apparatus. More particularly, the present invention relates to a method and apparatus for preparing a filled can for closing or "lidding" by cutting and removal of excess product from the can flange area and cleaning the same. The present invention has particular application in the food canning and processing industries because of the need for obtaining perfect seams for proper sealing. It will be understood, however, that the invention has a broader application in such areas as the packing of non-food stuffs where can sealing is a problem because of the nature of the product being packed.

2. The Prior Art

Particular care must be taken especially in the food canning industry to obtain a perfect seal in order to prevent spoilage of the food material. In canning operations utilizing metal cans this usually dictates the absence of any food particles or residue around the top edge or flange of the filled can in order to obtain a perfect seam to seal all possible air leaks. In the typical food canning operation, after a can is filled with a food product and liquid, it is delivered to a head spacer. Head space is obtained by inserting a plunger into the can to displace excess liquid and to compress the product prior to lidding. In the canning of meats and fish the filling operation may be performed by a plunger which is used to insert a block of product into the can in such a manner as to leave sufficient head space without the need for an independent head spacing operation. In either case, a lid is then sealed to the can by the formation of a crimped seam between the lid and a small outwardly flaring flange about the upper edge of the can. This seam must be tight enough to prevent contamination of the contents by bacteria or the like, or a serious health hazard will result. Although the packing of non-food products may not present health hazards, the formation of a perfect seal may be necessary to prevent spoilage or deterioration of the product.

During the filling of the can or the formation of a head space involving the use of a plunger, food particles sometimes protrude from or splash onto the exterior of the can and cling to the flange area. With some types of food, such as meats containing tough tissue or bone, the problem becomes quite severe. Food debris on the flange can makes a tight crimp between the flange and lid impossible, and thus interferes with proper sealing of the can. Although it is common to wash the can side preparatory to lidding and labeling, this washing operation is not effective to insure removal of food debris and is outside of the subject matter of this invention. There have been developed certain types of mechanical cutters for trimming the debris, however, these mechanical methods have not proven to be a satisfactory solution to the problem. One example of mechanical trimming apparatus is disclosed in U.S. Pat. No. 2,444,502, issued July 6, 1948 to W. C. Fromer. Consequently, the present practice in most canning operations is to inspect each can and manually remove debris and repair each defectively filled can by hand or to pull the can from the line. Because of high labor costs, this is an expensive operation and one which does not eliminate the possibility of a defective seam being overlooked and going unrepaired.

The food canning industry in particular, therefore, has a clear need for a device and method to prevent defective can seams caused by particles of food product lying along the flange area of the can. A device and method is thus needed which will alleviate the necessity for a labor intensive procedure and will remove the cause of defective seaming at the outset.

SUMMARY OF THE INVENTION

The present invention provides a method and apparatus for removing debris from the flange area of a can by a cutting operation which involves directing one or more high pressure water cutting jets onto the flange area against an anvil member while rotating the can about its longitudinal axis. A plunger carrying the anvil is inserted into the can and shields its contents from the spray of the high pressure water cutting jets. The anvil acts in cooperation with the cutting jet as a back-up member to cut the debris. Although the anvil-plunger member may displace excess liquid, insuring adequate head space, head space has already normally been provided prior to the operation of the anvil of the present invention. Thus it is contemplated that the flange trimming apparatus of the present invention may be inserted directly into the automated canning line between the conventional "filler" operation and the "seamer" apparatus.

In one embodiment of the invention, several flange trimming stations are arranged in a circle. Each station includes a rotatable platform for holding a can upright with the platforms being mounted on the periphery of a circular base table. The base table is rotated about its center by a motor coupled thereto through a gear ring and pinion arrangement. As the base table rotates, a stationary rub rail is positioned to frictionally engage the can platforms so as to rotate them about their vertical axes as the base table rotates. The high pressure water cutting jet is mounted on the base table at each station and is aimed and focused in a generally tangential direction to the area occupied by the flange of a can positioned on the associated platform. The cutting jets provide a constant stream of high pressure water which will cut and dislodge debris around the flange as the platform rotates. A freely rotatable anvil forming plunger is suspended over each platform from an upper member which rotates with the base table. A cam and follower arrangement first raises the anvil-plunger while the can is fed onto its associated platform, and then lowers the anvil into engagement with the can. The anvil enters the open can top in the head space previously provided and, through its frictional engagement with the can, is caused to rotate with the can. The anvil cooperates with the cutting jets to actually sever any particle of can product and to remove the same. Of course, with the anvil in place in the open can top the contents of the can are shielded from entry of water from the jet spray. The can is rotated a predetermined number of times as the table rotates through a full circle and the plunger is again raised and the can removed from the platform. A shield between the water cutting jets and cans is provided in the areas where the plunger is raised and a can is on the platform.

In a second embodiment of the invention, the rotatable base table which supports the rotatable can platforms is driven by means of a variable speed hydraulic motor which may also drive the various can feed mechanisms. In this manner the drive mechanisms may be coordinated and the speed selectively controlled. Additionally, a positive air pressure is introduced through orifices in the bottom face of the anvil which eliminates the possibility of any vacuum action as the anvil-plunger is removed from the can thus preventing any adherence of the food product to the anvil as it is removed. Similarly the bottom face of the anvil may be dished or concave to aid in the elimination of any adherence of food particles to the anvil as it is removed. The positive air pressure is admitted to the anvil only at the moment the anvil is withdrawn from the can top immediately prior to being removed from the flange trimmer.

The above described system is highly effective and yet economical. The simple design of the apparatus makes it a highly reliable machine requiring little maintenance. The machine may be inserted into a conventional food processing line, and operated at the normal can speed of the automated line. The system cuts labor costs since it virtually eliminates the need for manual seam repair and uses little power and only a small quantity of water for its operation.

DETAILED DESCRIPTION OF A PREFERRED EMBODIMENTS

Figure 1:
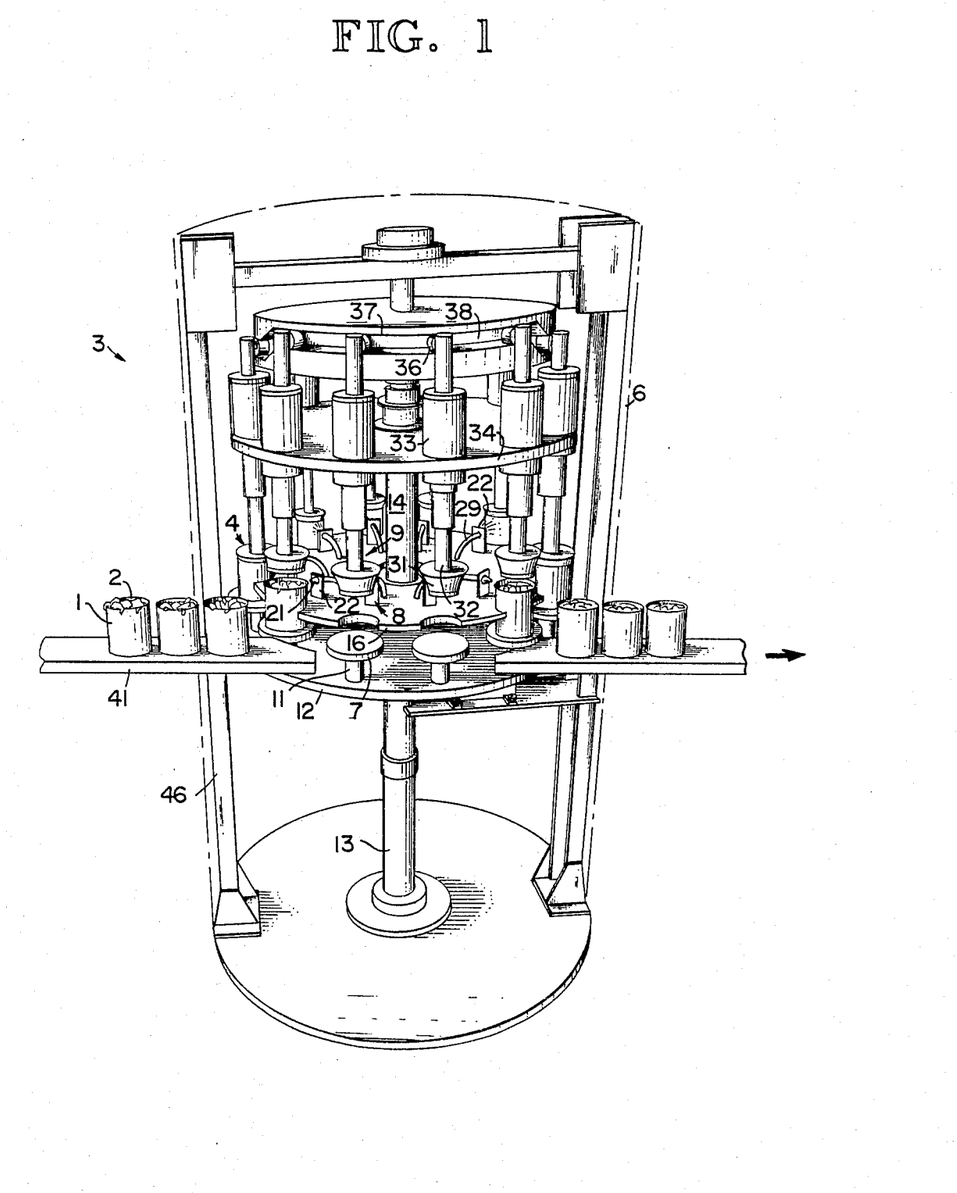
FIG. 1 is a perspective view of a first embodiment of the invention, with cans in place at the trimming station and certain parts removed for clarity.
Figure 2:
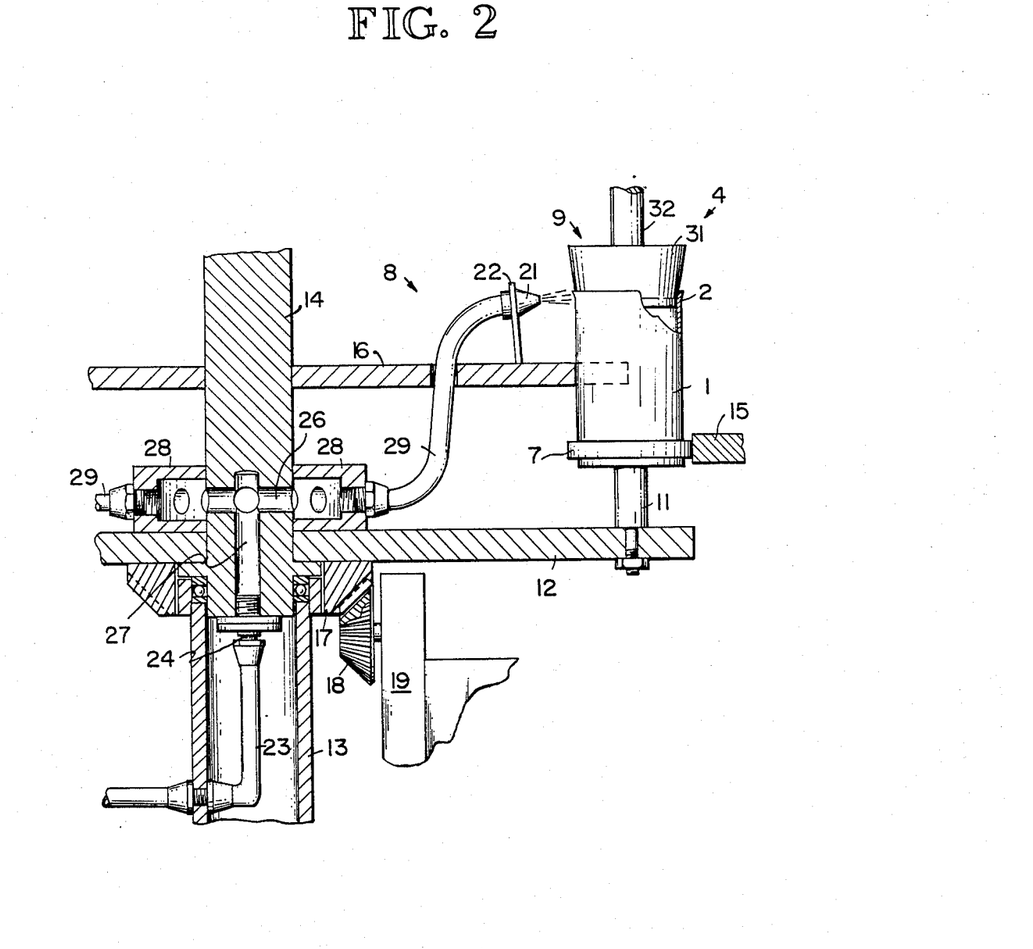
FIG. 2 is a cross-sectional view of a portion of a FIG. 1 embodiment in the vicinity of a flange trimming station.
Figure 3:
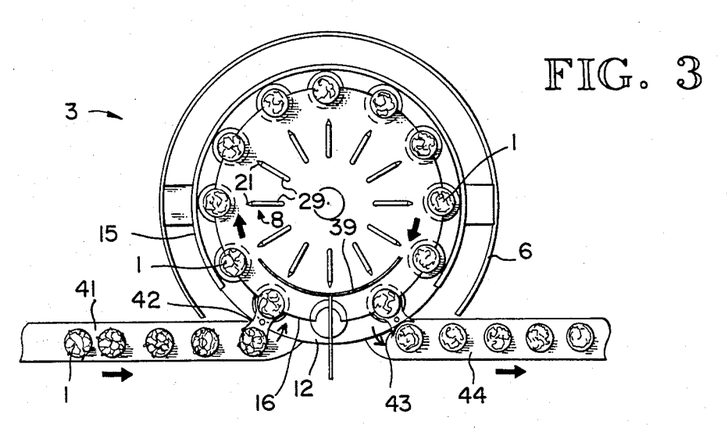
FIG. 3 is a schematic top view of the FIG. 1 embodiment.

Referring to FIGS. 1, 2 and 3, a conventional cylindrical can 1 for processed food products has an outwardly flaring flange 2 on its upper edge which is used to form a crimped seam with a flat, circular lid to seal the contents against bacteria and other contaminants. In a preferred embodiment of a flange trimming device 3 of the present invention, twelve flange trimming stations 4 are arranged in a revolving circular formation within an outer shell 6 to shield surrounding personnel from spray or debris. Each station 4 includes a platform 7 which supports and rotates a can 1, a high pressure cutting jet spray assembly 8 which trims protruding products from the flange area of the can, and a plunger assembly 9 which forms an anvil against which the cutting jet acts as a knife. The anvil-plunger 9 also shields the can contents from the jet spray.

The platforms 7 are freely rotatably mounted on shafts 11 extending upward from a rotatable base table 12 supported on a pedestal 13 and centered on a central shaft 14 which is rotatable therewith. A riser table 16 having semi-circular cut-out portions to position the cans 1 on the platforms 7 is mounted to the central shaft 14 at approximately the level of the vertical midpoint of the cans 1. A stationary rub rail 15 adjacent the outermost points of the platforms 7 and in frictional contact therewith will rotate the platforms 7 as the base table 14 is rotated. The table is driven by a ring gear 17 on its underside meshed with a pinion 18 powered by a conventional two horsepower motor 19 to rotate the base table 12 and central shaft 14. A rotation rate of approximately 22½ rpm is advantageous in that it is slow enough to ensure long life of the device with little maintenance, while being sufficient for a twelve-station device to achieve a high can processing rate of about 252 cans per minute. The rotation rate may be varied, of course, depending on the can processing rate desired. Gearing between the motor 19 and ring gear 17 can be provided as necessary to result in the desired rotation rate, by means commonly known to those having ordinary skill in the art.

Each jet spray assembly 8 includes a jet spray nozzle 21 held by a bracket 22 which is affixed to the riser table 16 to aim the nozzle 21 at the area occupied by the flange 2 of a can 1 positioned on the platform 7. The nozzle 21 is supplied with pressurized water by an inlet conduit 23 extending through the pedestal 13 to a swivel connection 24 at the base of a vertical bore 27 in the central shaft 14. Four horizontal bores 26 direct the water from the vertical bore 27 to each of four manifolds 28 supported on the base table 12. Each manifold 28 supplies pressurized water to three adjacent nozzles 21 through hoses 29 extending through apertures in the riser table 16. Although a single nozzle 21 has been found to give satisfactory results, two or more nozzles aimed at the same spot, or at several different spots on a can flange may alternatively be used. The jet nozzles 21 may be provided with an orifice diameter in the order of 0.004 inches and the water pressure may be in the range of 20–55,000 PSI to produce an effective water knife for cutting material from the can flange. The size of the nozzle and the water pressure required, of course, will depend upon the character of the product being canned. For instance, with respect to salmon canning it is necessary to have the ability to sever and cut away bone or tough skin material which requires the higher pressure ranges. The cutting jet acts against the plunger side wall as an anvil in its severing action as will presently be understood.

The plunger assembly 9 of each trimming station 4 includes a plunger head or anvil 31 which is tapered and dimensioned to fit within the can 1 sufficiently tightly to seal its contents against entry of water from the jet spray nozzle 21, and to displace excess liquid from the can if necessary to insure the desired volume of head space therein. The plunger head 31, which also assures proper centering of the can 1 on the platform 7, is suspended directly over the platform 7 by a vertical spindle 32 which is rotatably and vertically movable within a cylinder or guide sleeve 33. The spindle and guide sleeve are carried on an upper table 34 which rotates with the central shaft 14 and base table 12. A cam follower or roller 36 at the uppermost end of each spindle 32 rolls within a stationary circular cam track 37 having a rise 38 over about 105° of the circle formed therein to lift the plunger 31 upward so that incoming cans may be positioned and outgoing cans removed from beneath. Referring to FIG. 3, a spray shield 39 formed by a stationary arcuate plate extending between the cans 1 and nozzles 21 over an angle of approximately 140° prevents water from entering the cans 1 while the plungers 31 are raised. The spray shield 39, which is omitted from FIG. 1 for clarity may be supported by a strut 40 which extends outward under the raised plungers 31 and is attached to any convenient non-moving part of the machine frame 46 by any well-known means. Alternatively, valving can be provided to stop the spray while the plungers are raised. It may also be acceptable in some cases to omit both the shield and valving, since the volume of water dispensed by the nozzles 21 is small, and would total only a few cubic centimeters per can while the anvil-plunger 31 is raised.

Figure 4:
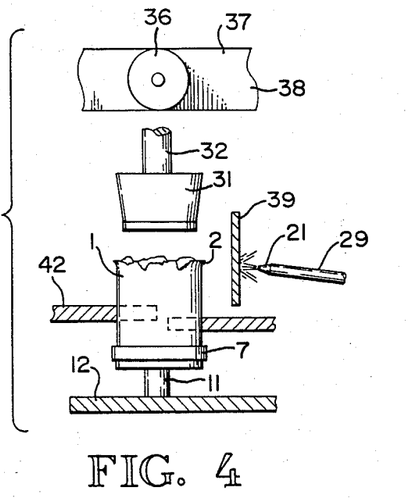
FIGS. 4–7 are schematic sequential views of the flange trimming station and can of the FIG. 1 embodiment.
Figure 5:
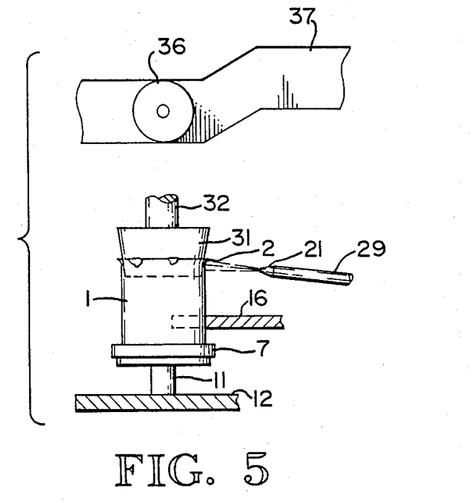
Figure 6:
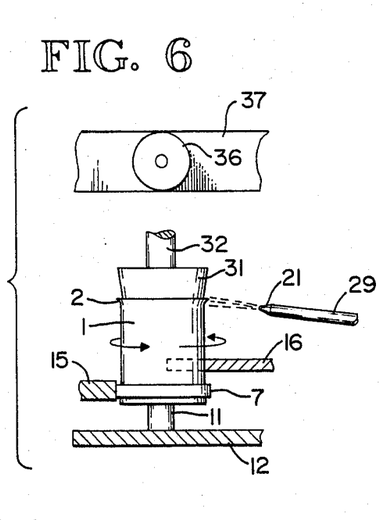
Figure 7:
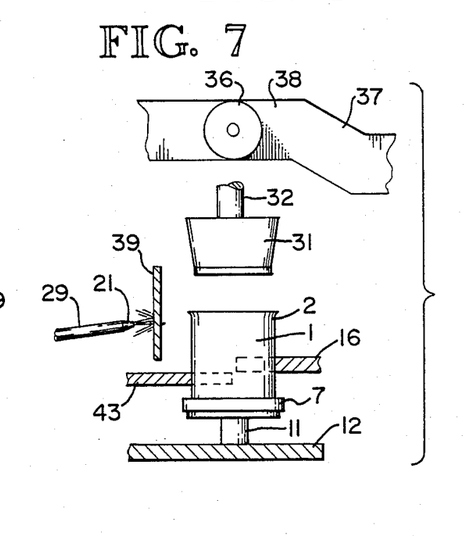

In operation, the upper table 34 and base table 12 rotate with the central shaft. Cans 1 filled with a product are delivered from a conventional filling machine to the device 3 on an infeed conveyor 41. A star infeed gear 42, or any other commonly known infeed mechanism, feeds the cans 1 onto the platforms 7 as platforms pass by on each rotation of the base table 12. As shown in FIG. 4, the plunger or anvil 31 is in a raised position as the can 1 is loaded onto the platform 7, and the spray shield 39 intercepts the flow from the nozzle 21. As shown in FIGS. 5 and 6, as the upper table 34 and base table 12 rotate, the cam follower 36 of the plunger assembly 9 reaches that portion of the cam track 37 which causes the plunger to be lowered into engagement with the can 1. The stationary rub rail 15 causes the platform 7 to rotate, which in turn rotates the can 1 and anvil 31. The water cutting jet stream from the nozzle 21 trims debris from the flange 2 using the anvil in its positive cutting action. As the upper table 34 and base table 12 continue to rotate, the cam follower 36 reaches the rise 38 in the cam track 37, raising the plunger 31 up from the can 1, with the shield 39 once again intercepting the flow from the nozzle 21, as shown in FIG. 7. An outfeed star gear 43 then removes the can 1 from the platform 7 and places it on an outfeed conveyor 44 which delivers the cans to a conventional lidding machine.

Figure 8:
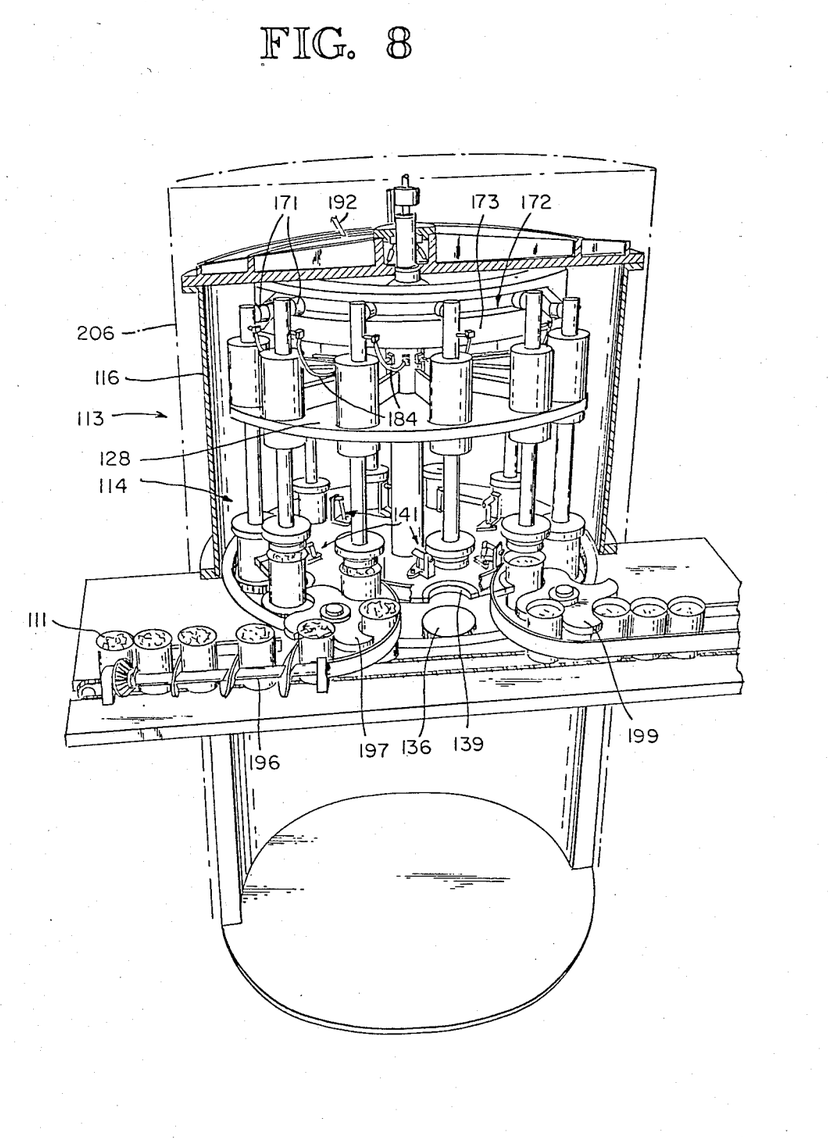
FIG. 8 is a perspective view of a second embodiment of the invention, with cans in place at the trimming stations and certain parts removed for clarity.
Figure 9:
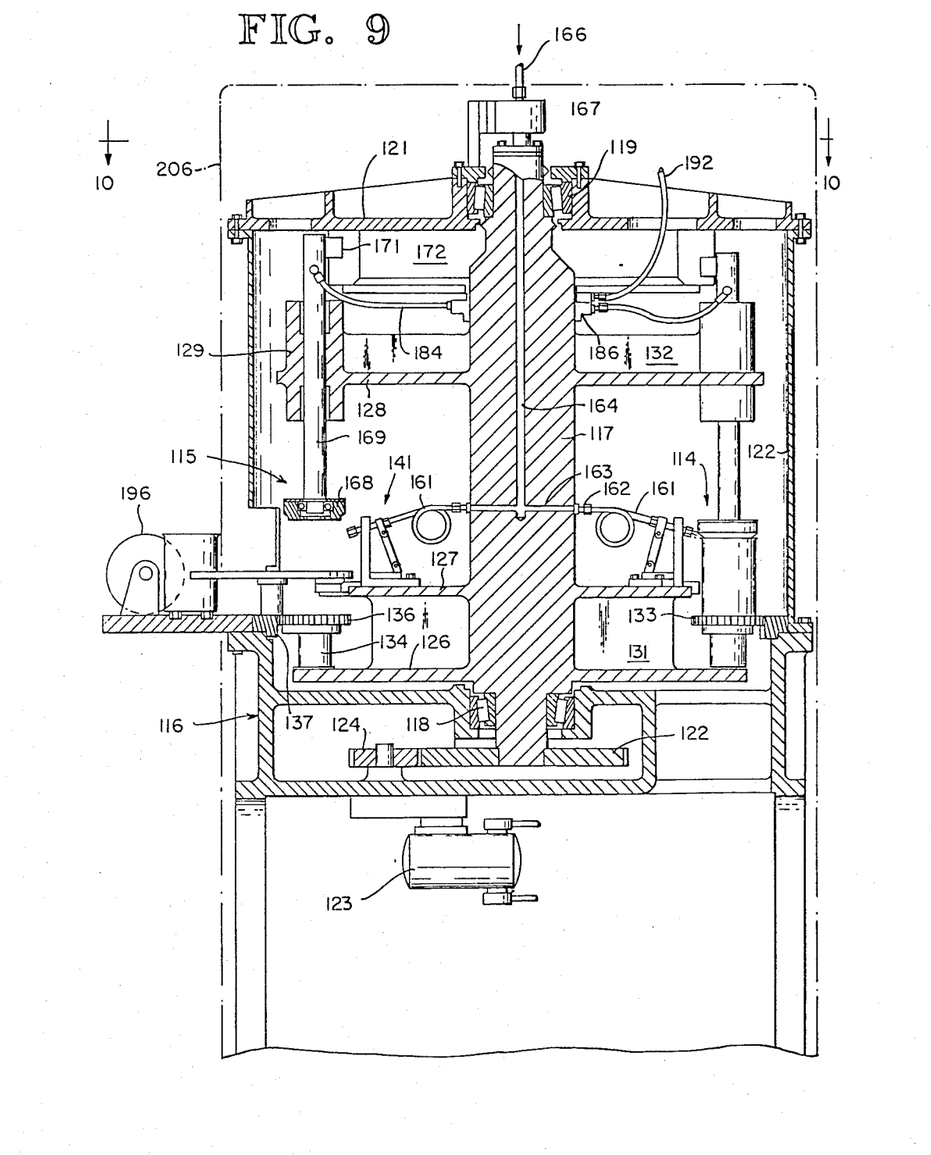
FIG. 9 is a vertical cross-section taken along the vertical center line of the embodiment of FIG. 8.

A modified form of the can flange trimming device is shown in FIGS. 8-13. In this form of the invention, the flange trimming device 113 is provided with trimming stations 114 in a manner previously described, there being 12 such stations in the particular machine illustrated. As shown in FIG. 9, a leg supported base frame 116 provides support for the vertical central shaft 117 which has a lower bearing mount 118 and an upper bearing mount 119 in the top or cover plate 121 of the machine. The cover plate 121 may be supported by the side walls 122 which partially surround the central shaft 117 and which are in turn connected to and supported by the base of frame 116. The bottom end of the central shaft 117 is provided with a drive gear 122 which is driven by means of a variable speed hydraulic motor 123 and a drive pinion 124 in a conventional manner. The shaft 117 is provided with a circular base table 126 formed by a flange on the shaft. The base table 126 supports the can platforms presently to be described. A riser table or turret 127 is formed by a second flange on the shaft 117 and serves to support the cutting nozzles.

A third circular flange 128 on the central shaft provides guide sleeves 129 for plunger guide rods. Support webs 131 and 132 may be used to rigidify the associated flanges.

The base table 126 supports the twelve can support platforms 133 which are mounted on the vertical shafts 134. The shafts 134 are mounted to freely rotate relative to the table 126 or in the alternative, the can platforms 133 themselves may be rotatable relative to the vertical shafts 134. In any event, the can platforms are provided with peripheral gear teeth 136 which mesh with a stationary annular gear ring 137 mounted on the inner periphery of the base support frame 116 as shown in FIG. 9. The function of the gear ring 137 and the gearing on the periphery of the can platforms is identical to the function of the rub bar 15 in the FIG. 1 embodiment, namely that of rotating the can about its own vertical axis as the can moves with the rotatable table 126. The gearing may be selected in order to control the speed of the can as it moves about the circular path in order to provide the prerequisite number of rotations of the can for the desired cutting. In the alternative, independent drive means may be provided for the rotation of the can platforms so as to be selectively controllable depending on the number of rotations desired throughout the path of the can in the trimming machine.

Figure 13:
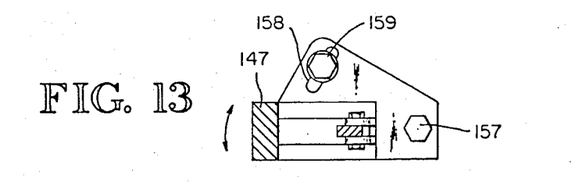
FIG. 13 is a cross-sectional view taken along lines 13—13 of FIG. 11.

The turret 127 is provided with arcuate cut-out sectors 138 which engage the approximate midsections of cans 111 as they are carried on the platforms 133. The cut-outs 138 may be provided with press fitted sizing inserts 139 to adapt the machine for reception of different sizes of cans as desired. Each flange trimming station is provided with a jet nozzle assembly 141 also carried by the turret 127. Referring to FIG. 11, each nozzle unit 142 may be of a conventional design and, as previously explained, will have an orifice diameter in the order of 0.004 inches. The orifice size, however, may be varied, depending upon the amount of pressure utilized as well as the type of product being canned and other variable factors. It will be understood, however, that in any event the high pressure jet produced by the nozzle 142 must in all cases be capable of actually cutting or severing the excess product. The anvil provided by the plunger assembly 115 serves as the back-up or support in the conventional cutting sense of a "knife and anvil". The nozzle 142 may be carried by a terminal fitting 143 mounted in a holder 144 and supported by the angle bracket 146. The bracket 146 has a vertical member 147 and a horizontal plate 148 which is mounted to the turret 127. The end fitting 143 may be provided with a ball and socket mounting 149 in the vertical leg 147 to permit free adjustment of the nozzle 142 for proper aiming of the jet stream at the desired angle of impingement against the anvil and can flange. In order to provide adjustment about a horizontal axis, the holder 144 may be connected to the pivoted link 151 by means of a pin and slot connection 152 in a well known manner to provide for vertical adjustment of the angle of the jet stream. The link 151 is pivoted to the horizontal arm 148 by means of the pivotal connection 153. If necessary the pivotal connection 153 may also be a pin and slot to increase the range of adjustment. The pin members 154 and 156 of the pivotal connections 152 and 153 respectively may comprise clamp bolts for holding the end fitting 143 in its position of adjustment. In order to provide adjustment of the jet nozzle about a vertical axis, the horizontal arm 148 is permitted free rotation about the bolt 157 as a pivot point. A slot 158 and clamp bolt 159 are located on the arm 148 as shown in FIG. 13 to enable the nozzle support 146 to be clamped in a predetermined position for aiming the jet stream. With this arrangement, referring especially to FIG. 10, the jet nozzle assembly 141 may be positioned so as to direct a jet stream tangentially at the can flange on either side of the can so as to accommodate the rotation of the can in either direction if desired. This feature is of importance in installations where the entire flange trimming machine must be located on the opposite side of a canning line from that shown in FIG. 10. In this instance, of course, the direction of rotation of the base table 126 would be reversed resulting in reverse rotation of the cans from that shown in FIG. 10.

The high pressure fluid for the jet nozzle 142 is supplied through the high pressure fluid lines 161 which are flexible to the degree necessary to allow adjustment of the end fittings 143 and aiming of the nozzle. The lines 161 are connected by suitable fittings 162 to the horizontal passage ways 163 which are in turn connected to a single supply passage 164 within the vertical shaft 117. Although the shaft 117 in FIG. 9 is shown as a solid casting or the like, it will be well understood by those skilled in the art that other constructions are possible, the desired feature being that of locating the high pressure fluid lines within the vertical shaft 117. A high pressure fluid line 166 will be connected to a suitable source of high pressure fluid with a swivel connection 167 permitting the shaft 117 to rotate during supply of the high pressure fluid. The high pressure fluid source may comprise any suitable pressure intensifier or pump system well known in the art which is capable of producing fluid pressure of the magnitude required for any particular trimming operation. As aforementioned, fluid under pressure at about 20–55,000 PSI has been successfully used in the canning of salmon product which presents the severe problem of bone and skin tissue cutting.

Each plunger assembly 115 comprises an anvil member 168 and vertical plunger rod or spindle 169 which is mounted for free vertical movement within an associated guide sleeve 129 carried by the circular flange 128 on the shaft 117. The reciprocating operation of the plunger assembly 115 is substantially identical to that described for the FIG. 1 embodiment. The anvils 168 are suspended directly over the platforms 133, as seen in FIG. 9, and, of course, rotate with the central shaft 117 and the base table 126. A cam follower or roller 171 at the uppermost end of each spindle 169 rolls within a stationary circular cam track 172 mounted to the cover plate 121. As shown in FIG. 8, the cam track 172 has a rise 173 over about 105° of the circle formed thereby to lift the spindles 169 and anvils upward so that incoming cans may be positioned and outgoing cans are removed from beneath the anvil.

The details of the anvil 168 are shown most clearly in FIG. 11. The spindles 169 to which the anvils are connected comprise hollow tubes which are closed at their top ends and fitted with the anvil members at their bottom ends. The anvil 168 is mounted so as to be freely rotatable on the spindle 169 by means of the bearings 174 and are held on the ends of the spindles 169 by means of the retainer rings 176. The anvil 168 is cylindrical in cross-section having a bottom end 177 of reduced diameter which will be sized so as to snugly fit the particular can 111 being trimmed. As shown in FIG. 11, the can 111 is normally provided with a flange or angled lip portion 178 which is used in the crimping operation during the sealing of the lid on the can top. An angled or tapered shoulder 179 on the anvil provides a transition between the reduced diameter portion 177 and the upper body of the anvil, with the angle of the shoulder being chosen to cooperate with the can lip 178 in the cutting operation. In the trimming of salmon product it has been found that an angle in the range of from 30°–45° with horizontal provides optimum results in severing the flexible bones which may protrude onto the area of the lip 178 of the can. The angle of the shoulder 179 in this particular application acts as a "bone tensioner" for the cutting jet with the anvil itself providing the back support which allows the bone to be cut rather then simply allowed to flex. It will be understood, of course, that the angle of the shoulder 179 for any given trimming operation would depend upon the type of product being packed.

Figure 11:
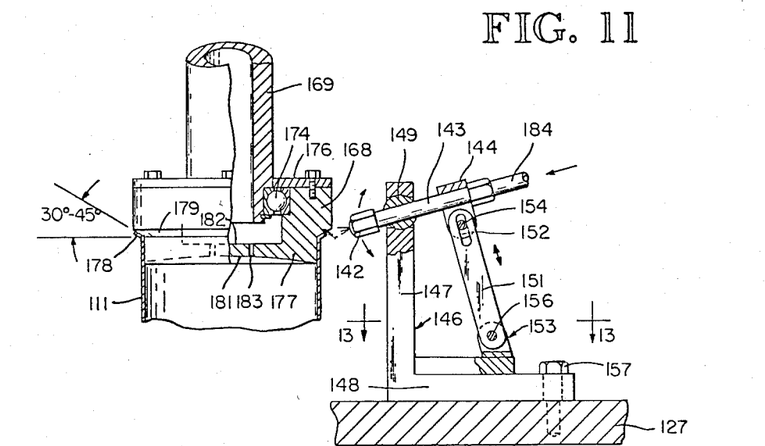
FIG. 11 is a partially sectioned detail showing a jet nozzle mounting and the anvil-plunger in place in the can top.
Figure 12:
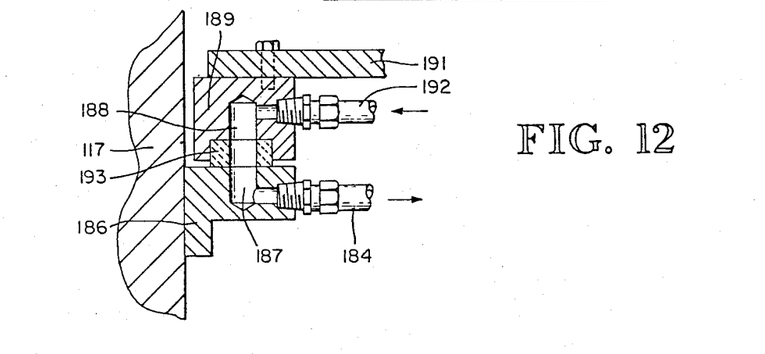
FIG. 12 is a cross-sectional detail showing the valving means for the positive air pressure systems.

The anvil 168 is provided with a concave or dished bottom face 181 which aids in the prevention of vacuum formation and the adherence of food product or the like to the bottom face of the anvil as it is removed from the can after the trimming operation. In addition, the bottom wall 182 of the anvil is provided with a plurality orifices 183 which connect the outside surface 181 to the interior of the hollow spindle 169. The hollow interiors of the spindles 169 are connected via the air hoses 184 to a ring 186 affixed to the shaft 117 for rotation therewith. Referring to FIG. 12, the ring 186 provides inlet openings 187 which are positioned to register with an air pressure conduit 188 in the valving block 189 secured to a plate 191 which may be connected to any stationary part of the machine frame such as the cam track 172 as shown in FIG. 9. The conduit 188 is provided with air pressure via the air hose 192 from a suitable remote source (not shown). As will be seen in FIG. 12, the ring 186 and inlet 187 for each plunger assembly rotates with the central shaft 117 as the cans move from the loading position to the unloading position where the cans are again discharged onto a moving conveyor line. The valving block 189 is positioned above the discharge station where the can is discharged from the rotating base table following the removal of the anvil member from the can top. A ceramic seal 193 may be provided between the stationary valve block 189 and the moving ring 186. As the inlet opening 187 moves into registry with the air pressure outlet 188, air under pressure is supplied to the respective hollow spindle 169 and passes through the orifices 183 into the can between the concave face 181 and the food product. In this manner the lifting or sucking out of any food product as the anvil is removed is prevented.

Figure 10:
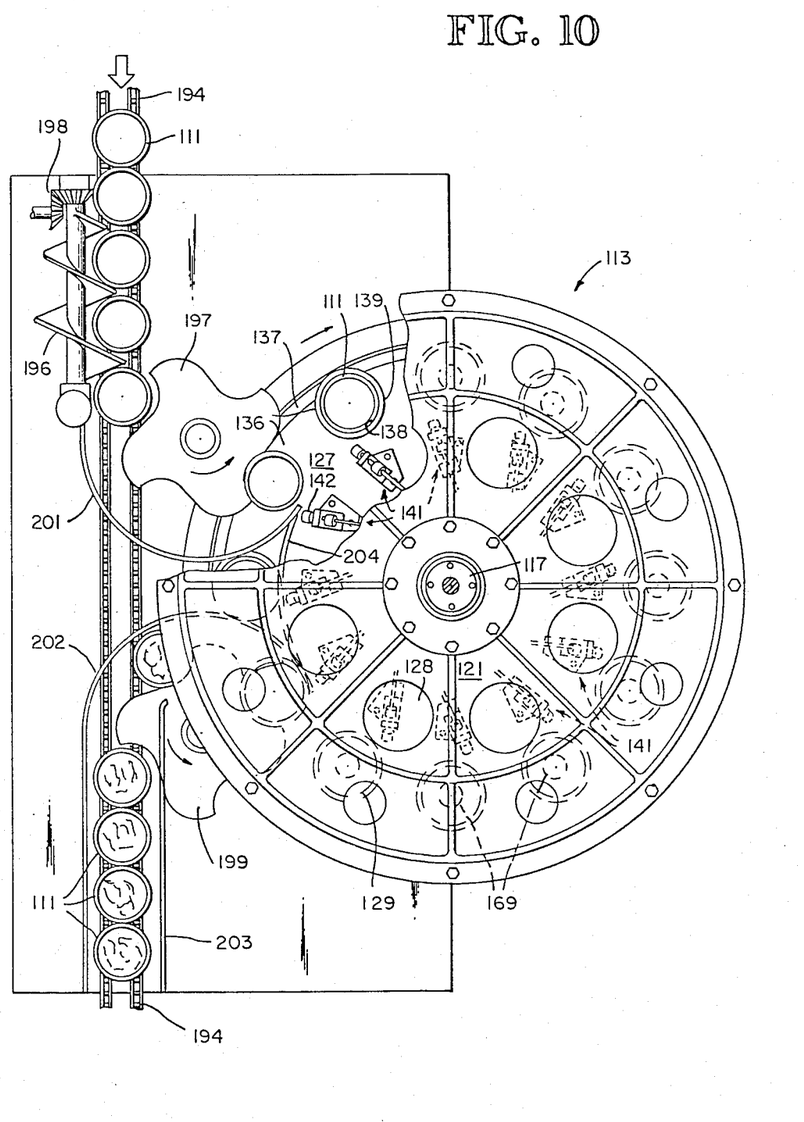
FIG. 10 is a horizontal cross-section taken along lines 10—10 of FIG. 9.

FIG. 10 is a plan view illustrating the can loading and unloading mechanism for the flange trimmer. A continuous operating conveyor 194 is adapted to be inserted into a continuous canning line between a conventional can "filler" mechanism (not shown) upstream from the can flange trimmer and a conventional "lidder" device (not shown) located downstream of the unit. The conveyor 194 will be driven at the proper speed to accept filled cans and unload the trimmed cans from the unit at the normal operating speed of the line. As the cans 111 approach the flange trimming mechanism, a helical spacer device known in the industry as screw spacer 196 is used to properly space the cans as they approach the star wheel transfer device 197, which removes the cans from the conveyor and loads them on the can platforms 133 in a well known manner. A second star wheel 199 is located in position to remove the trimmed can from the rotating can platform of the trimming device as illustrated in FIGS. 8 and 10. In practice, it is preferable to drive the conveyor chain 194, the screw spacer 196, the infeed and outfeed star wheels 197 and 199 respectfully and the shaft 117 of the flange trimming unit by the variable speed hydraulic motor 123 shown in FIG. 9. In this manner, the drives for these various interconnected operating units may be coordinated.

An arcuate guide rail 201 is positioned around the periphery of the infeed star wheel 197 in order to retain the cans in position against the star wheel as they move onto the can platforms 133. A second arcuate guide rail 202 is positioned about the periphery of the outfeed star wheel 199 to retain the cans in position against the star wheel as they move from the can platform back onto the moving conveyor 194. The guide rail 202 has a linear portion extending along the conveyor chain parallel to the guide rail 203 to maintain the cans on the chain conveyor as they move away from the flange trimming device. The arcuate guide rails 201 and 202 extend above the level of the rotating turret 127 and have their inner end portions connected by a third arcuate rail 204 which functions as a shield to prevent the jet stream from the constantly operating jet nozzles from entering the open can tops prior to the lowering of the anvil at the infeed position and subsequent to the removal of the anvil at the outfeed position. As seen in FIG. 10, the opposite ends of the shield 204 will extend a sufficient distance about the periphery of the turret 127 to block the jet spray until the anvil has been lowered.

In operation, the cans 111 approach the flange trimmer device on the conveyer 194 and are loaded onto the rotating turret 127 and can platforms 133 by means of the screw spacer 196 and the star wheel loader 197. The speed of operation of these units will be so coordinated as to deliver the cans to the can platform in timed sequence with the rotation of the vertical shaft 117. The cans at this time have been filled with product and proper head space will normally have been provided at the can filler. As seen in FIG. 10, the jet stream at the loading station is blocked from impinging upon the can by the arcuate shield 204 and the anvil 168 is initially in the raised position at the time the can is placed on the platform 133. The can platform, of course, rotates in the direction of the arrows in FIG. 10 as the turret rotates. As soon as the can is in place on the can platform, the cam follower of the respective trimming station reaches that portion of the cam track 173 which lowers the anvil into the can top as rotation continues. Because of the flanged lip of the can and the tapered shoulder 179 on the anvil, the can is automatically centered relative to the anvil and the rotating can causes rotation of the anvil 168 as the trimming station progresses around its circular path. In practice, the anvil will be inserted into the can top a distance of approximately 5/16 of an inch. The dished or concave bottom face 181 of the anvil will not normally come into contact with the top surface of the product in the can. It will also be noted that, from the loading station and throughout the path of the can prior to reaching the unloading station, there is no positive air pressure in the hollow spindles 169. Continuous rotation of the can and anvil occur throughout the path of the can because of the meshing of the gear ring 137 and the geared periphery of the can platform. The direction of rotation of the can is into the path of the jet stream from the nozzles 142 as illustrated in FIG. 10. The nozzles will have been preadjusted by operation of the adjustable mounting so as to impinge at the optimum angle onto the can lip and anvil surface 179. The number of rotations of the can flange into the jet stream may be controlled by the gearing arrangements so as to provide the optimum number for the product being canned. It will also be evident that the jet spray itself may be focused so that the central part of the jet stream provides the knife cutting action against the anvil while the entrained peripheral water particles serve to remove the debris which is cut by the jet stream. As rotation of the turret continues the cam follower 171 reaches the rise portion 173 on the cam track to remove the anvil vertically out of the can top. At this point the inlet passage 187 of the respective trimming station comes into registry with the outlet conduit 188 of the stationary valving block 189 to provide a positive air pressure stream through the spindle 169. The air pressure is applied via the orifices 183 into the area between the concave bottom face of the anvil and the food product to insure that no food product is sucked out of the can or adheres to the bottom face of the anvil as it is removed. At this point it will also be noted that the jet nozzle for the respective trimming station has moved into position in back of the spray shield 204 thus eliminating any chance of introducing the jet stream into the open top of the can. Outfeed star wheel 199 then removes the can 111 from the can platform and places it on the outfeed portion of the conveyer 194 which delivers the can to a conventional lidding machine.

If desired, a spray shield 206, indicated in dotted lines in FIG. 8, may be designed to enclose the entire flange trimming device to prevent the escape of water spray and to protect workman or observers from the constantly running water jets. Preferably the shield would be partially or fully transparent to permit observance of the operation of the machine for inspection purposes. A removable bell shaped cover providing inlet and outlet openings for the cans may be placed over the entire machine as desired to permit easy removal for repair and maintenance.

Although the present invention has been described with respect to preferred embodiments used in the environment of food processing, modifications to the disclosed embodiment, or its use in a different setting is well within the scope of the invention.

What is claimed is:

1. A method for clearing solid product debris from the peripheral edge of the opening of a container filled with the product prior to lidding with the use of high pressure fluid cutting jet means comprising the steps of:
   providing a container filled with said solid product;
   forming at least one high pressure fluid cutting jet stream;
   aiming said at least one high pressure fluid cutting jet stream at the peripheral edge of the opening of the container; and
   producing relative movement between said container and said at least one high pressure cutting jet to move the cutting jet along said peripheral edge,
   the path of the cutting jet being aimed so as to contact and sever any solid debris on said peripheral edge prior to lidding.

2. The method according to claim 1 wherein said edge has an upstream side and a downstream side relative to the direction of said jet stream, said method including the steps of;
   placing an anvil member adjacent said edge on the downstream side thereof in the path of said cutting jet, and focusing the cutting jet so that the central part of the jet stream provides a knife cutting action against the anvil to cut said debris while the entrained peripheral fluid particles remove the cut debris.

3. The method of claim 1 including the step of shielding the interior of said container from said cutting jet stream.

4. The method of claim 2 including the step of shielding the interior of said container from said cutting jet stream.

5. A method for clearing solid product debris from the peripheral top edge of a filled open top container prior to lidding with the use of high pressure fluid cutting jet means comprising the step of:
provviding a container filled with said solid product;
forming at least one high pressure fluid ctting jet stream;
aiming said at least one high pressure fluid cutting jet stream at the peripheral top edge of said container; and
producing relative rotation between said container and said at least one high pressure cutting jet about a central longitudinal axis of the container,
said jet stream being aimed so as to contact and sever any solid debris on said peripheral edge and remove the same prior to lidding.

6. The method of claim 5 including the step of;
inserting an anvil member into the top opening of said container prior to directing said at least one cutting jet stream, and
focusing the cutting jet so that the central part of the jet stream provides a knife cutting action against the anvil to cut said debris while the entrained peripheral fluid particles remove the cut debris
said anvil member cooperating with the peripheral top edge of said container to provide a cutting back-up surface and debris particle tensioner for the cutting jet while shielding the interior of the container from introduction of fluid from said jet stream.

7. The method of claim 6 including the steps of;
rotating said container through at least 360° subsequent to application of said cutting jet stream, then terminating application of said cutting jet stream, and then
withdrawing said anvil from the container top.

8. The method of claim 7 including the step of;
introducing positive air pressure through said anvil member into the interior of said container during withdrawal of said anvil, whereby
adherence of material in said container to the bottom face of said anvil is prevented.

9. The method of claim 7 wherein said cutting jet is aimed in a substantially tangential direction to said container edge and said container is rotated relative to said cutting jet so as to move the edge in the opposite direction from the jet stream.

10. The method of claim 9 wherein said cutting jet stream is maintained at from 20,000 to 55,000 PSI during the cutting action.

11. The method of claim 10 including the step of;
providing head space above the material in said container prior to insertion of said anvil.

12. A method for preparing an open top can having an upper peripheral edge filled with solid product for lidding comprising the steps of:

displacing the solid product contents of said can from the open end thereof to form a predetermined head space;
inserting an anvil member into said head space;
rotating said can about its central longitudinal axis;
forming a high pressure fluid cutting jet means;
aiming said high pressure fluid cutting jet means at said peripheral edge;
focusing the cutting jet means so that the central part of the cutting jet means provides a knife cutting action against said anvil member to cut solid product debris while the entrained fluid particles remove the cut debris during rotation of the can;
interrupting said cutting jet means after a predetermined number of rotations of said can;
withdrawing said anvil member from the can top; and
applying positive air pressure to said head space while withdrawing said anvil member.

13. An apparatus for preparing an open end container having an upper peripheral edge filled with solid product for lidding comprising in combination:
means for displacing the contents of said container from the open end thereof to form a predetermined head space;
a source of high pressure fluid; and
means for directing a high pressure fluid cutting jet stream from said source of high pressure fluid about the peripheral edge of said container so as to contact and sever any solid product debris thereon and remove the same without introduction of the jet stream into the interior of the container prior to lidding.

14. An apparatus for preparing an open end container having an upper peripheral edge filled with solid product for lidding comprising in combination;
means for displacing the contents of said can from the open end thereof to form a predetermined head space;
container support means for supporting and rotating said container about its central axis;
anvil carrying plunger means mounted about said container support means including control means for inserting said anvil into said head space;
a source of high pressure fluid;
high pressure fluid jet cutting means connected to said source of high pressure fluid mounted adjacent said container support means for directing a cutting jet means aimed at said peripheral edge and focusing the cutting jet means so that the central part of the cutting jet means provides a knife cutting action against said anvil to cut solid debris while the entrained peripheral fluid particles remove the cut debris during a predetermined number of rotations thereof;
said control means being adapted to insert said anvil into said head space prior to application of the cutting jet means to shield the contents of the container and to withdraw said anvil after said predetermined number of rotations of the container; and
air pressure means operatively associated with said anvil for applying a positive air pressure into said head space beneath said anvil during withdrawal of said anvil to prevent adherence of material in said container to the bottom face of said anvil.

15. Apparatus for clearing the peripheral top edge of an open top container filled with solid product prior to lidding comprising:

container support means for supporting and rotating said container about its central axis;

plunger means mounted about said container support means and including an anvil member mounted on the bottom end thereof adapted to be inserted into the open top of a container in place on said container support means;

a source of high pressure fluid;

high pressure fluid jet cutting means connected to said source of high pressure fluid mounted adjacent said container support means for directing a cutting jet means aimed at said edge and focusing the cutting jet means so that the central part of the cutting jet means provides a knife cutting action against said anvil to cut solid product debris while the entrained peripheral fluid particles remove the cut debris during a predetermined number of rotations only thereof; and control means operatively associated with said plunger means for moving said anvil member into the container top prior to application of said cutting jet means to the container edge to shield the contents of said container from the cutting jet means and to withdraw said anvil after said predetermined number of rotations.

16. The apparatus of claim 15, wherein said container support means comprises;
a base table,
means to rotate said base table about a vertical axis,
container platform means rotatably mounted on said base table, and
means for rotating said container platform means so as to rotate a container resting thereon about its vertical axis as the base table rotates.

17. The apparatus of claim 16 wherein said base table is mounted on a vertical shaft and said means to rotate said base table comprises a variable speed hydraulic motor drivingly connected to rotate said shaft.

18. The apparatus of claim 16 including;
a stationary ring adjacent the periphery of said base table and located at the level of said container platform, and
means acting between said ring and the peripheral edge of said container platform to produce rotation of said platform as the base table is rotated.

19. The apparatus of claim 16 wherein said plunger means comprises;
a vertical shaft centered with respect to said container platform,
shaft guide means mounted for rotation with said base table for slidably engaging said vertical shaft,
said anvil means being freely rotatably mounted to the bottom end of said shaft whereby rotation thereof is permitted when frictionally engaged with the open end of a container positioned on said container platform.

20. The apparatus of claim 19 wherein the bottom face of said anvil is concave for maintaining said face out of contact with the contents of the container.

21. The apparatus of claim 20 wherein said vertical shaft is hollow, said apparatus further including;
air pressure supply port means operatively associates with said vertical shafts,
said anvil member being provided with a plurality of orifices connecting said concave bottom surface with the hollow interior of the vertical shaft, and
means for connecting said air pressure supply port means with said vertical shaft during withdrawal of the anvil from the container top, whereby positive air pressure is introduced into the container between the anvil and the container contents.

22. The apparatus of claim 19 wherein said anvil comprises;
a cylindrical upper body portion and a reduced diameter bottom end portion adapted to fit into a container top, and
a tapered annular shoulder between said upper body portion and said bottom end portion.

23. The apparatus of claim 22 wherein said container edge is flared outwardly to accept a lid crimp and said tapered annular shoulder cooperates with said container to back-up and tension any debris thereon for cutting by said cutting jet.

24. The apparatus of claim 16 including;
a riser table mounted for rotation with said base table,
said riser table including turret means for contacting the approximate mid section of a container in position on said container platform to retain the container thereon during rotation, and
nozzle mounting means on said riser table for mounting said high pressure fluid jet cutting means.

25. The combination according to claim 24 wherein said nozzle mounting means comprises;
means for clamping the nozzle of said fluid jet cutting means in fixed position during cutting,
means for adjusting the position of said nozzle about a vertical axis, and
means for adjusting the position of said nozzle about a horizontal axis.

* * * * *